United States Patent
Suwa et al.

(10) Patent No.: US 7,564,647 B2
(45) Date of Patent: Jul. 21, 2009

(54) FILTERING DEVICE FOR A MAGNETIC DISC APPARATUS

(75) Inventors: Masaya Suwa, Kawasaki (JP); Keiji Aruga, Kawasaki (JP); Yoshiharu Matsuda, Kawasaki (JP); Keishi Shimizu, Kawasaki (JP); Hiroshi Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 282 days.

(21) Appl. No.: 11/287,278

(22) Filed: Nov. 28, 2005

(65) Prior Publication Data

US 2007/0025015 A1 Feb. 1, 2007

(30) Foreign Application Priority Data

Jul. 29, 2005 (JP) .............................. 2005-220951

(51) Int. Cl.
*G11B 33/14* (2006.01)
(52) U.S. Cl. .................................................. 360/97.02
(58) Field of Classification Search ................ 360/97.02
See application file for complete search history.

(56) References Cited

U.S. PATENT DOCUMENTS

| 5,204,793 | A | * | 4/1993 | Plonczak | 360/97.01 |
| 6,208,484 | B1 | * | 3/2001 | Voights | 360/97.02 |
| 6,266,208 | B1 | * | 7/2001 | Voights | 360/97.02 |
| 6,600,625 | B1 | * | 7/2003 | Munninghoff et al. | 360/97.02 |
| 6,636,379 | B2 | * | 10/2003 | Rannow et al. | 360/97.02 |
| 6,826,009 | B1 | * | 11/2004 | Scura et al. | 360/97.03 |
| 7,307,812 | B2 | * | 12/2007 | Kim et al. | 360/97.02 |
| 2005/0041334 | A1 | | 2/2005 | Kim et al. | 360/97.02 |
| 2005/0168867 | A1 | * | 8/2005 | Miyajima | 360/97.02 |

FOREIGN PATENT DOCUMENTS

JP 2003-151258 5/2003
JP 2005-071584 3/2005

* cited by examiner

*Primary Examiner*—Angel A. Castro
(74) *Attorney, Agent, or Firm*—Greer, Burns & Crain, Ltd.

(57) ABSTRACT

A magnetic disc apparatus has a ramp holding the magnetic head in a position apart from the magnetic disc and a filter case holding a filter in the state of being bent in such a manner that the filter surrounds the ramp together with the magnetic disc. The filter removes dust in airflow which flows in the magnetic disc apparatus accompanying the rotation of the magnetic disc.

2 Claims, 7 Drawing Sheets (A)

(B)

FILTERING DEVICE FOR A MAGNETIC DISC APPARATUS

BACKGROUND OF THE INVENTION

1. Field of the Invention

The present invention relates to a magnetic disc apparatus in which a magnetic head is positioned on a rotating magnetic disk to access the magnetic disk.

2. Description of the Related Art

Conventionally magnetic disk apparatus have found great use as apparatus incorporated in or externally connected to computers. In recent years, magnetic disk apparatus have been incorporated not only in computers in a narrow sense but also in video devices, digital cameras, vehicle navigation devices, etc.

Magnetic disk apparatus are broadly divided into two types: one called a contact stop/start (CSS) type and the other called a load/unload type. In the CSS-type magnetic disk apparatus, a magnetic head for accessing a magnetic disk is left in a state of being placed on the magnetic disk. When the magnetic disk in a CSS-type magnetic disk apparatus is rotated, the magnetic head is floated by an air flow accompanying the rotation to be slightly spaced apart from the magnetic disk surface. In this state, the magnetic disk is accessed with the magnetic head.

On the other hand, in the load/unload-type magnetic disk, when the magnetic disk stops rotating the magnetic head is moved to a position off the outer circumference of the magnetic disk (which is called unloading) and maintained in a standby state at this position. After the magnetic disc has started rotating, it is moved onto the magnetic disk (which is called loading).

The conventional dominating magnetic disk apparatus have been CSS-type magnetic disk apparatus. However, with the increased recording density of magnetic disks in recent years, the surface roughness of magnetic disks has become lower, which heightens the risk of sticking (stiction) fault. Consequently, once the magnetic head is brought into contact with the magnetic disk surface, it sticks (adsorbs) to the magnetic disk surface.

With a CSS-type magnetic disk apparatus incorporated in a portable appliance such as a notebook computer, high shock resistance is required of the CSS-type device since the portable appliance is frequently carried. However, the CSS-type device is vulnerable to shock since the magnetic head contacts the magnetic disk.

Because of these problems, load/unload-type magnetic disk apparatus have been widely adopted in recent years. Load/unload-type magnetic disk apparatus can have higher shock resistance in comparison with CSS-type devices because the magnetic head is in the standby position off the magnetic disk when the magnetic disk apparatus is not operating.

Incidentally, magnetic disk apparatus requires excellent performance for removing dust in air therein as the magnetic disk should be kept as close as to the magnetic head. This is why a filter for removing dust is incorporated in most magnetic disk apparatus, making use of air flow accompanying the rotation of the magnetic disk.

FIG. 1 shows a schematic plane view of a CCS-type magnetic disc apparatus with its upper cover removed, and FIG. 2 shows a filter case incorporated in the CCS-type magnetic disc apparatus in FIG. 1.

A magnetic disc apparatus 10A is provided with a magnetic disc 12 which is driven to rotate in the direction indicated by the arrow A around a rotating shaft 11 by a Disc Control Motor (DCM) (not shown). The magnetic disc apparatus further includes a carriage arm 15 having a magnetic head 13 at the tip thereof as opposed to the magnetic disc 12 and swinging around a swing shaft 14, and a voice coil motor (VCM) 16 which drives the carriage arm 15 to swing and causes the magnetic head 13 to move in the direction of the radius of the magnetic disc 12. Writing data to and reading data stored in the magnetic disc 12 is performed as follows: The carriage arm 15 is driven to swing by the VCM 16, while the magnetic disc 12 is being rotated driven by the DCM, which causes the magnetic head 13 at the tip of the carriage arm 15 to be positioned at a desired track on the magnetic disc 12. Then, the magnetic head 13 magnetically and sequentially writes data to or picks up data from the desired track on the magnetic disc 12.

The magnetic disc apparatus 10A has an AD (activated carbon and a desiccant) unit 17 in order to keep air inside the apparatus dry.

Moreover the magnetic disc apparatus 10A has a filter case 18 holding a filter formed at air passage, making use of the fact that air flow is generated in the direction of the arrow A within the apparatus accompanying the rotation of the magnetic disc 12.

Parts (A) and (B) of FIG. 2 are perspective views of the filter case 18 viewed from different angles. The filter case 18 with a filter 19 held at the position indicated by the chain line is arranged in the magnetic disc apparatus 10A as shown in FIG. 1. As the filter case 18 has a slit shroud 181 formed on a surface thereof facing the magnetic disc 12, it not only holds the filter 19 but also suppresses a disc flutter caused by airflow accompanying the rotation of the magnetic disc 12.

FIG. 3 is a schematic plane view of a load/unload-type magnetic disc apparatus with its upper cover removed.

Explanation will be made only about the difference from the CCS-type magnetic disc apparatus which is represented in the figure.

Although it may seem that multiple carriage arms are shown, the figure intends to indicate movement of the carriage arm 15 and there is only one carriage arm.

The load/unload-type magnetic disc apparatus 10B has a ramp 21 which holds the magnetic head 13 unloaded at the position off the outer circumference of the magnetic disc 12 for standby. Because of the presence of the ramp 21, a filter case 22 for holding a filter 23 is arranged, for example, at the position shown in FIG. 3 instead of the position of the filter case 18 in FIG. 1. Japanese Patent Laid-Open No. 2003-151258 discloses a load/unload-type magnetic disc apparatus with a filter arranged in the position similar to that of the filter 23 in FIG. 3.

On the other hand, Japanese Patent Laid-Open No. 2005-71584 discloses a load/unload-type magnetic disc apparatus with a filter which is arranged in the position of the AD unit 17 in FIG. 3, but whose angle is about 90 degrees from that of the filter 23 in FIG. 3.

However, if a filter is arranged in the position shown in FIG. 3 and Japanese Patent Laid-Open No. 2003-151258, it can not largely take in air flow, leading to degraded performance of removing dust in air.

If a filter is arranged in the position of the AD unit 17 in FIG. 3 at the angle of about 90 degrees from the filter 23 in FIG. 3. as shown in Japanese Patent Laid-Open No. 2005-

71584, it requires space for large AD unit, leading to increased size of the apparatus.

SUMMARY OF THE INVENTION

The present invention has been made in view of the above circumstances, and provides a load/unload-type magnetic disc apparatus having a filter with excellent performance for removing dust.

The present invention provides a magnetic disc apparatus in which a magnetic head for accessing a magnetic disc is provided at the tip of a carriage arm, the magnetic head being positioned on the rotating magnetic disc to access the magnetic disc, the magnetic disc apparatus including:

a ramp holding the magnetic head in a position apart from the magnetic disc; and a filter case holding a filter in the state of being bent in such a manner that the filter surrounds the ramp together with the magnetic disc, the filter removing dust in airflow which flows in the magnetic disc apparatus accompanying the rotation of the magnetic disc.

As the magnetic disc apparatus according to the present invention is provided with the filter case holding the filter in the state of being bent in such a manner that the filter surrounds the ramp together with the ramp, a large filter workable over wide-area airflow can be provided without increasing the size of the apparatus, which realizes the magnetic disc apparatus that has high performance for removing the dust in the air inside the apparatus.

Preferably, a slit shroud is formed at one end of the filter case and is positioned near the magnetic disc.

As the filter case-holds the filter in the state of being bent so that the filter surrounds the ramp together with the magnetic disc, it is possible to arrange one end of the filter case in a position near the magnetic disc. Forming the slit shroud on the one end of the filter case strengthens stability of the travelling of the magnetic disc.

As described above, according to the present invention, it is possible to provide a load/unload-type magnetic disc apparatus having excellent removing-dust performance.

DETAILED DESCRIPTION OF THE INVENTION

An embodiment of the present invention will be described below with reference to the attached drawings.

Figure 4:
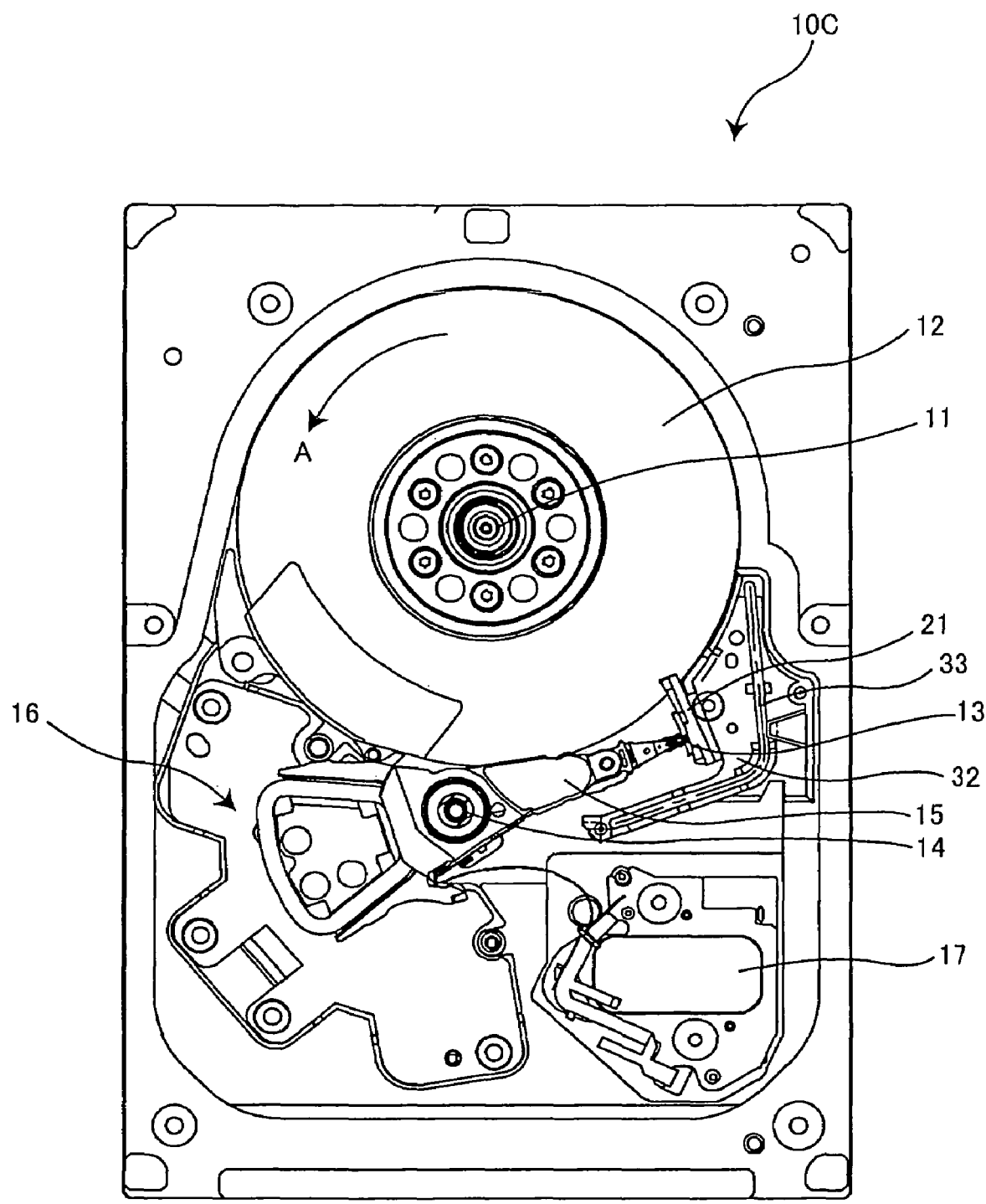
FIG. 4 is a plane view of a load/unload-type magnetic disc apparatus with its upper cover removed according to one embodiment of the present invention.
Figure 5:
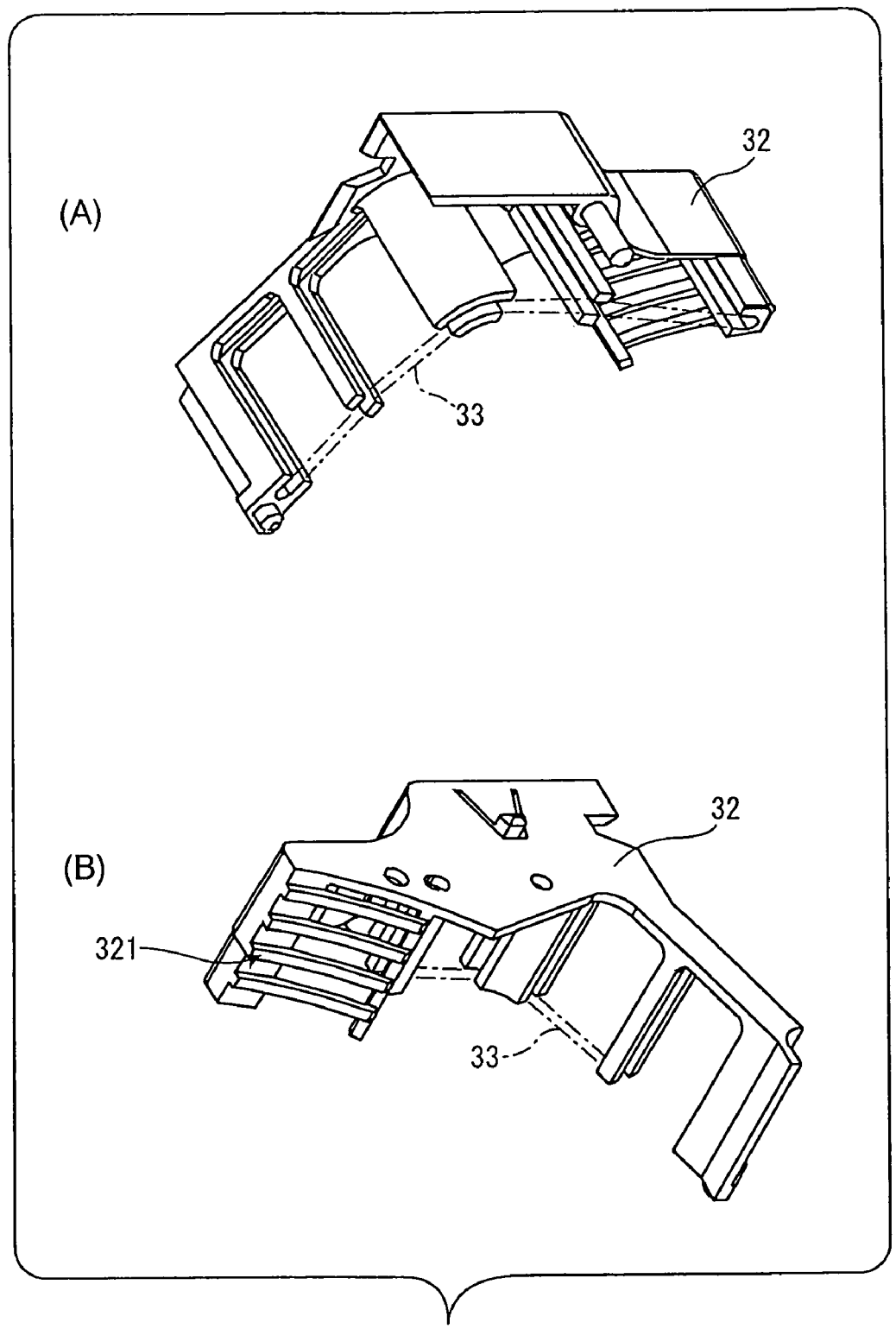
FIG. 5 is a perspective view of a filter case incorporated in the magnetic disc apparatus shown in FIG. 4.

FIG. 4 is a plane view of a load/unload-type magnetic disc apparatus with its upper cover removed according to one embodiment of the present invention, and FIG. 5 is a perspective view of a filter case incorporated in the magnetic disc apparatus shown in FIG. 4.

Figure 1:
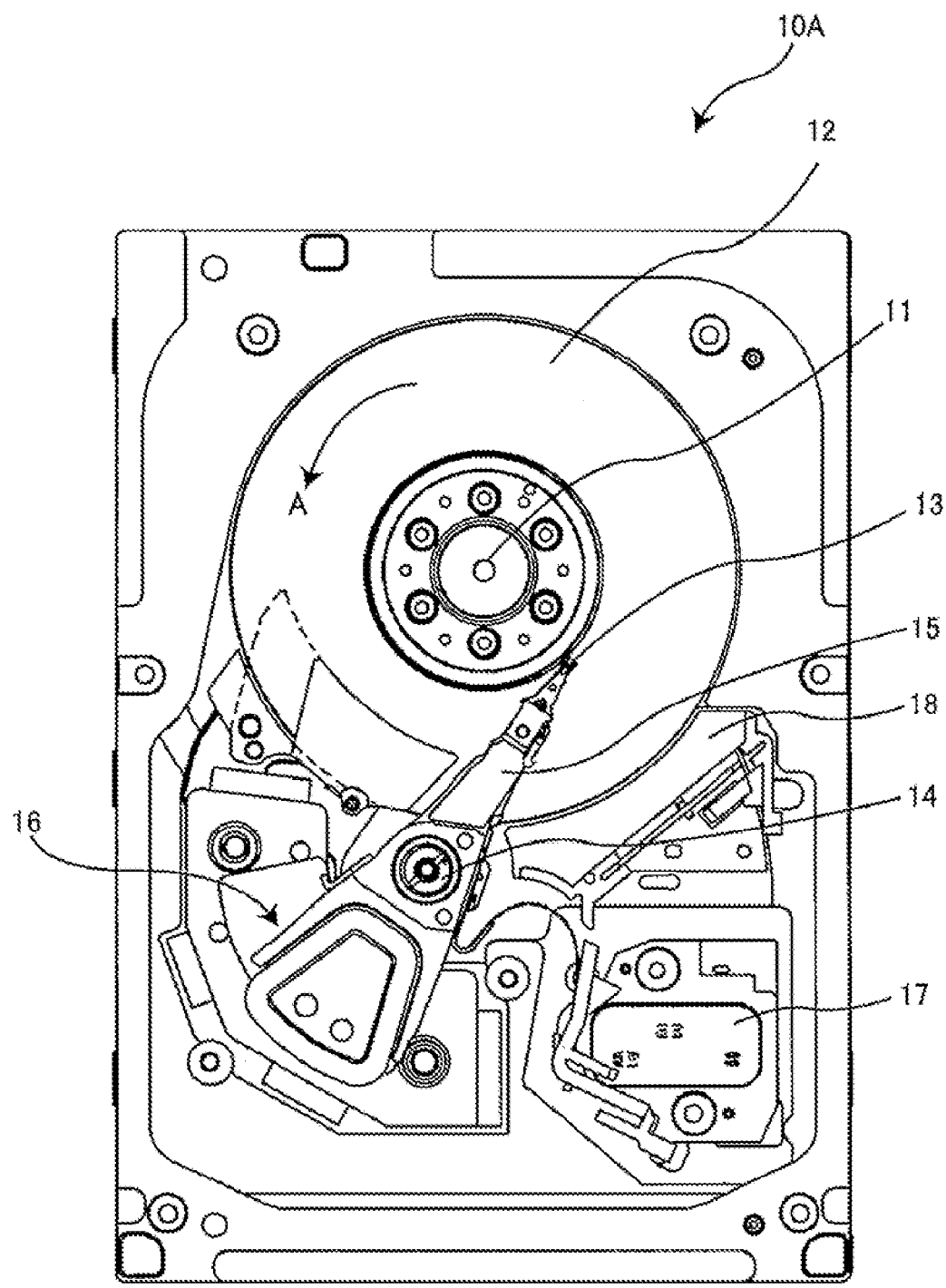
FIG. 1 is a schematic plane view of a CCS-type magnetic disc apparatus with its upper cover removed.
Figure 2:
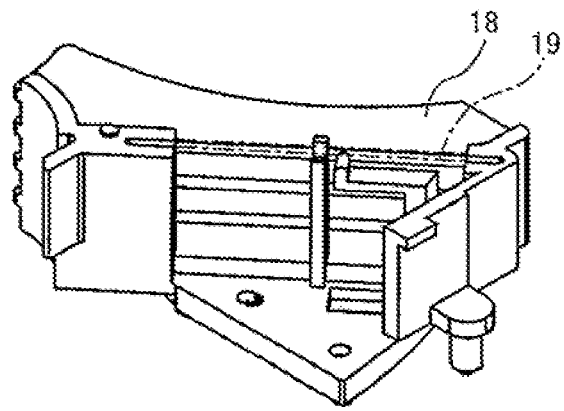
FIG. 2 is a perspective view of a filter case incorporated in the CCS-type magnetic disc apparatus in FIG. 1.
Figure 2:
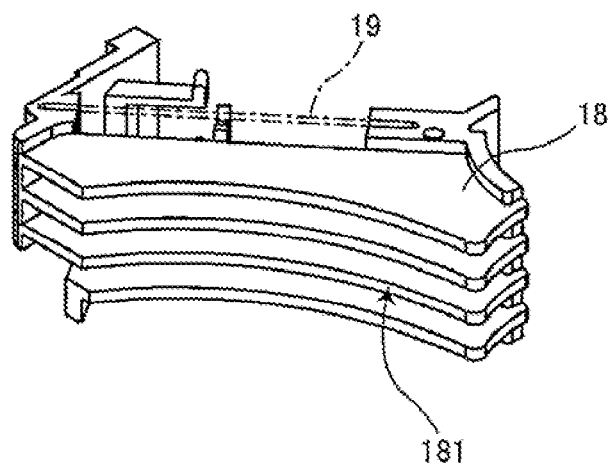
Figure 3:
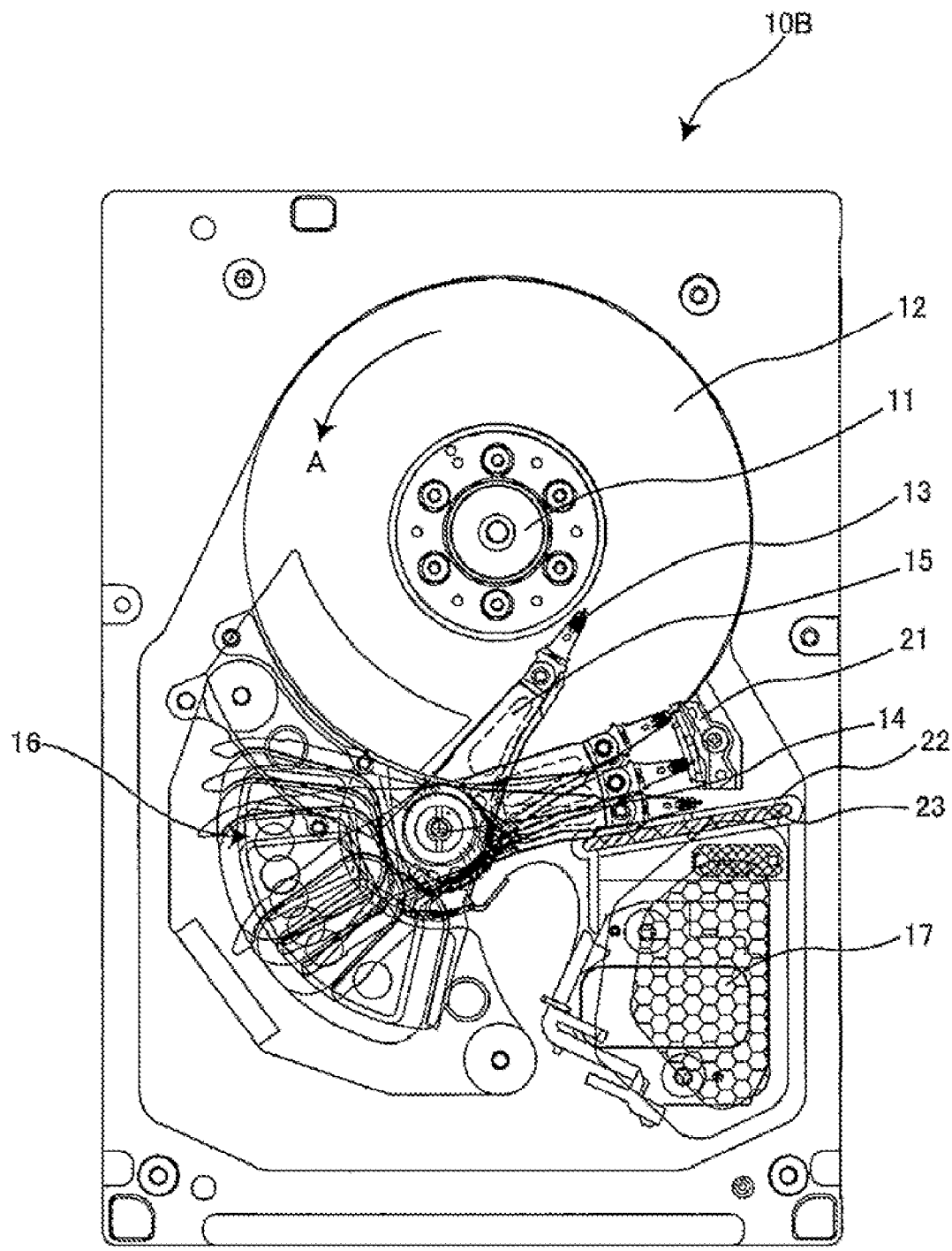
FIG. 3 is a schematic plane view of a load/unload-type magnetic disc apparatus with its upper cover removed.
Figure 6:
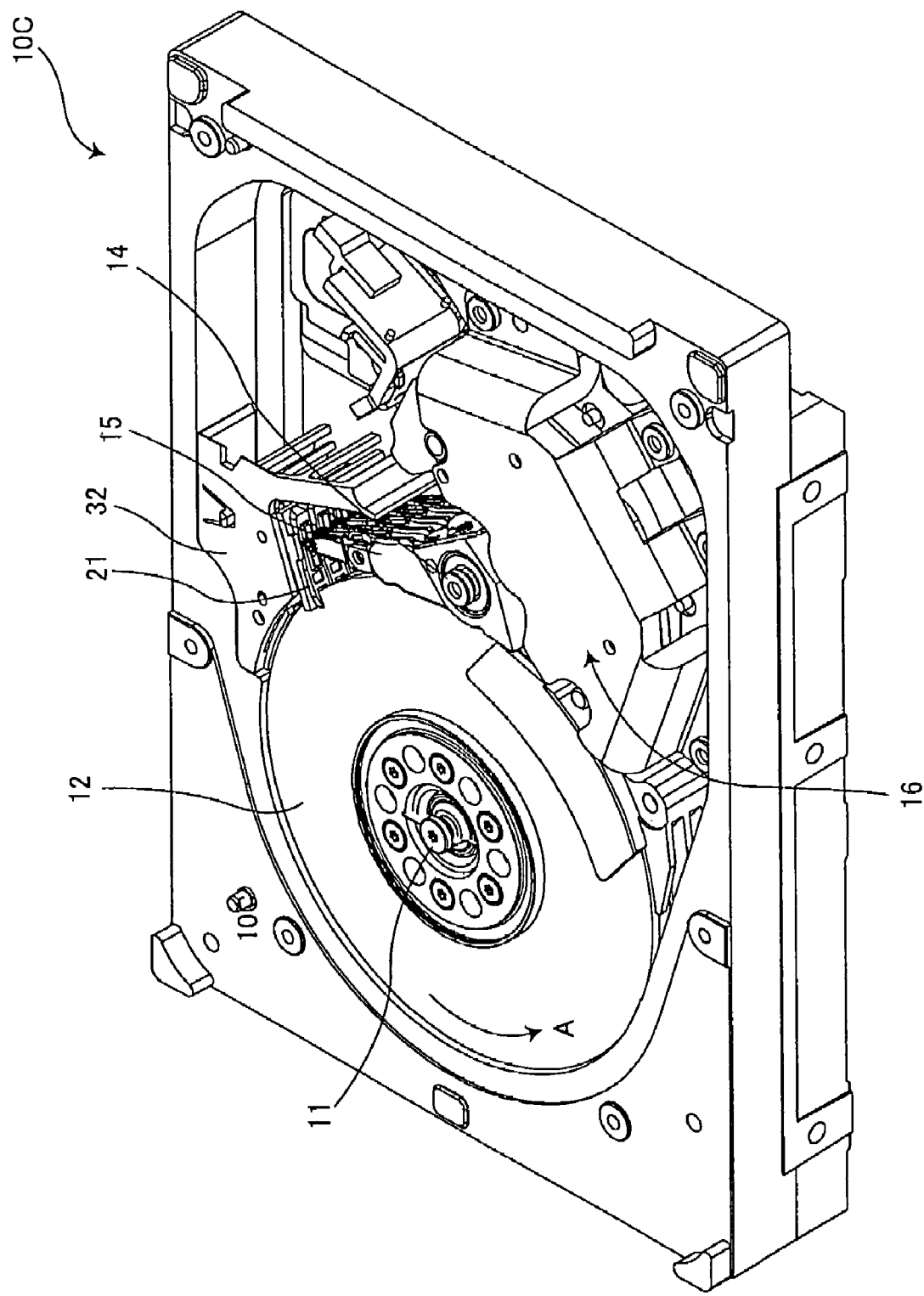
FIG. 6 is a perspective view of the magnetic disc apparatus shown in FIG. 4.
Figure 7:
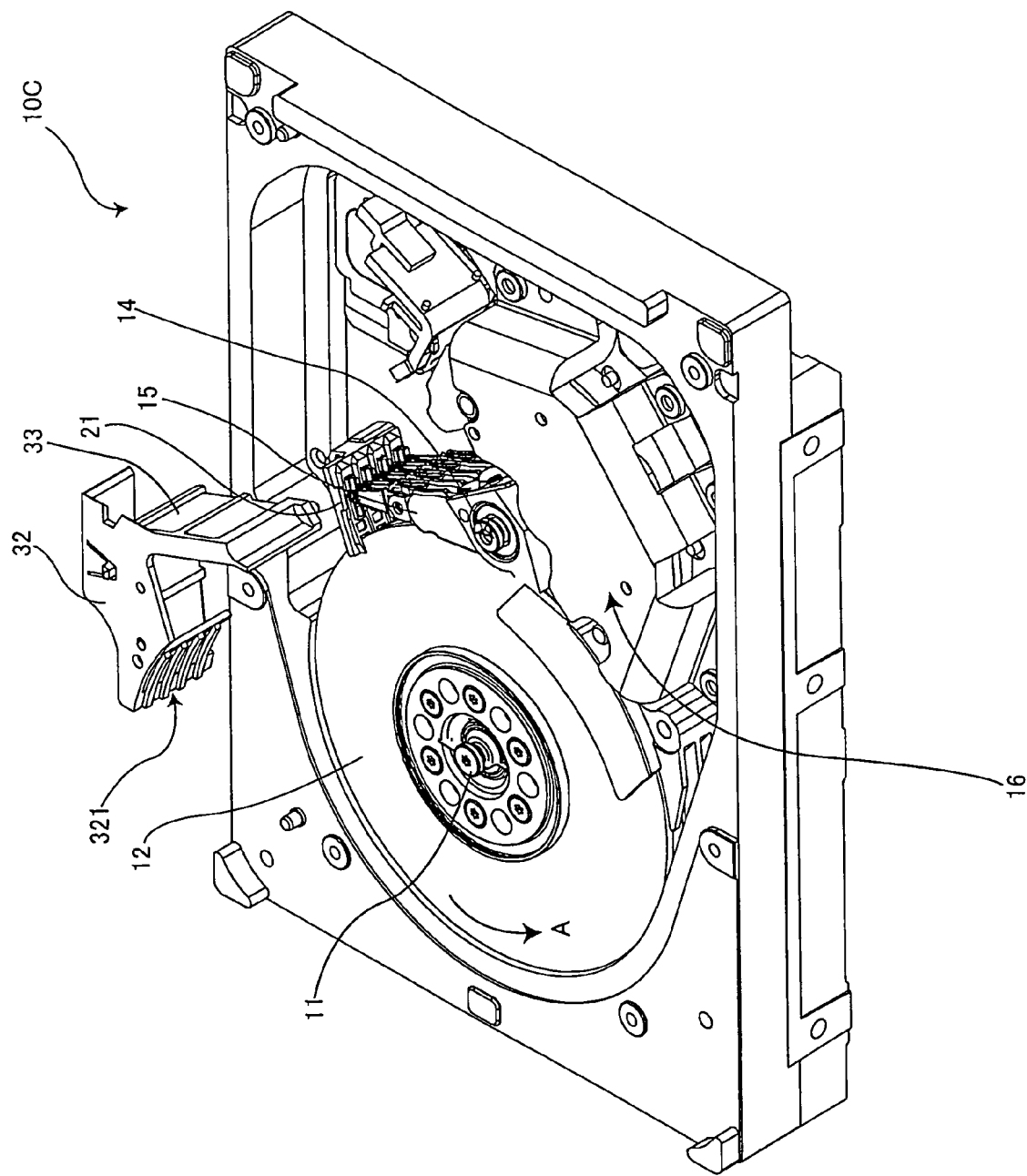
FIG. 7 is a perspective view of the magnetic disc apparatus shown in FIG. 4.

The reference characters are shared between components of the magnetic disc apparatus shown in FIGS. 1 and 3 and corresponding components in FIGS. 4, 6 and 7. A description will be given only of characteristic points of the embodiment of the present invention.

FIGS. 6 and 7 are perspective views of the magnetic disc apparatus whose plane view is shown in FIG. 4, each figure indicating that the upper cover as well as the AD unit 17 shown in FIG. 4 are removed. FIG. 6 does not show a filter in a filter case 32 while FIG. 7 shows an exploded view of the filter case 32.

The magnetic disc apparatus shown in FIGS. 4, 6 and 7 is the load/unload-type magnetic disc apparatus having the ramp 21 which holds the magnetic head 13 at a position apart from the magnetic disc 12.

In addition, the magnetic disc apparatus 10C has the filter case 32. The filter case 32 holds the filter 33 in the state of being bent as shown in FIG. 5 so that the filter 33 surrounds the ramp 21 together with the magnetic disc 12.

A slit shroud 321 (see part (B) of FIG. 5) is formed at one end of the filter case 32 near the magnetic disc 12, preventing flutter of the magnetic disc 12 caused by air flow accompanying the rotation of the magnetic disc 12.

According to the configuration and the position of the filter case 32, the large filter 33 is positioned in such a manner that it can efficiently take in air flow generated by the rotation of the magnetic disc 12 and flowing in the apparatus, thus enabling efficient dust removal. In addition, the large AD unit 17 can be arranged at the position near the filter case 32, similarly to the examples shown in FIGS. 1 and 3.

What is claimed is:

1. A magnetic disc apparatus in which a magnetic head for accessing a magnetic disc is provided at the tip of a carriage arm, the magnetic head being positioned on the rotating magnetic disc to access the magnetic disc, the magnetic disc apparatus comprising:

a ramp holding the magnetic head in a position apart from the magnetic disc; and a filter case holding a filter in the state of being bent in such a manner that the filter surrounds the ramp together with the magnetic disc, the filter extending from a side surface of the carriage arm to a back surface of the ramp as viewed from the carriage arm, and the filter removing dust in airflow which flows in the magnetic disc apparatus accompanying the rotation of the magnetic disc.

2. The magnetic disc apparatus according to claim 1, wherein a slit shroud is formed at one end of the filter case and positioned near a magnetic case.

\* \* \* \* \*